(12) United States Patent
Chen et al.

(10) Patent No.: US 11,543,696 B2
(45) Date of Patent: Jan. 3, 2023

(54) OPTICAL SURFACE MAPPING SYSTEM

(71) Applicant: HIMAX TECHNOLOGIES LIMITED, Tainan (TW)

(72) Inventors: Hung-Shan Chen, Tainan (TW);
Ming-Syuan Chen, Tainan (TW);
Ming-Shu Hsiao, Tainan (TW);
Cheng-Hung Chi, Tainan (TW);
Kuan-Ming Chen, Tainan (TW);
Chin-Jung Tsai, Tainan (TW);
Yi-Nung Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 409 days.

(21) Appl. No.: 16/516,236

(22) Filed: Jul. 18, 2019

(65) Prior Publication Data
US 2021/0018791 A1 Jan. 21, 2021

(51) Int. Cl.
*G02F 1/1335* (2006.01)
*G02F 1/1333* (2006.01)

(52) U.S. Cl.
CPC .. *G02F 1/133504* (2013.01); *G02F 1/133365* (2013.01)

(58) Field of Classification Search
CPC .............. G02F 1/133504; G02F 1/133365
See application file for complete search history.

(56) References Cited

U.S. PATENT DOCUMENTS

| | | | |
|---|---|---|---|
| 2005/0286125 A1* | 12/2005 | Sundstrom | H04N 13/373 359/462 |
| 2006/0023149 A1* | 2/2006 | Lin | G02F 1/133707 349/129 |
| 2006/0239171 A1* | 10/2006 | Ooi | G02B 5/18 369/112.16 |
| 2008/0055536 A1* | 3/2008 | Shimozono | G02F 1/29 349/200 |
| 2010/0260030 A1* | 10/2010 | Tao | G02B 5/1828 |
| 2019/0101381 A1 | 4/2019 | Chen et al. | |

FOREIGN PATENT DOCUMENTS

| TW | 201413340 A | 4/2014 |
|---|---|---|
| TW | I498597 B | 9/2015 |
| TW | 201712419 A | 4/2017 |

\* cited by examiner

*Primary Examiner* — Lucy P Chien
(74) *Attorney, Agent, or Firm* — CKC & Partners Co., LLC

(57) ABSTRACT

A liquid crystal element includes a substrate, a diffractive optical element layer, and a liquid crystal material. The diffractive optical element layer has an uneven surface. The liquid crystal material is between the substrate and the uneven surface of the diffractive optical element layer. The liquid crystal material is disposed contiguously with the uneven surface of the diffractive optical element layer.

8 Claims, 11 Drawing Sheets

130

RI

RI

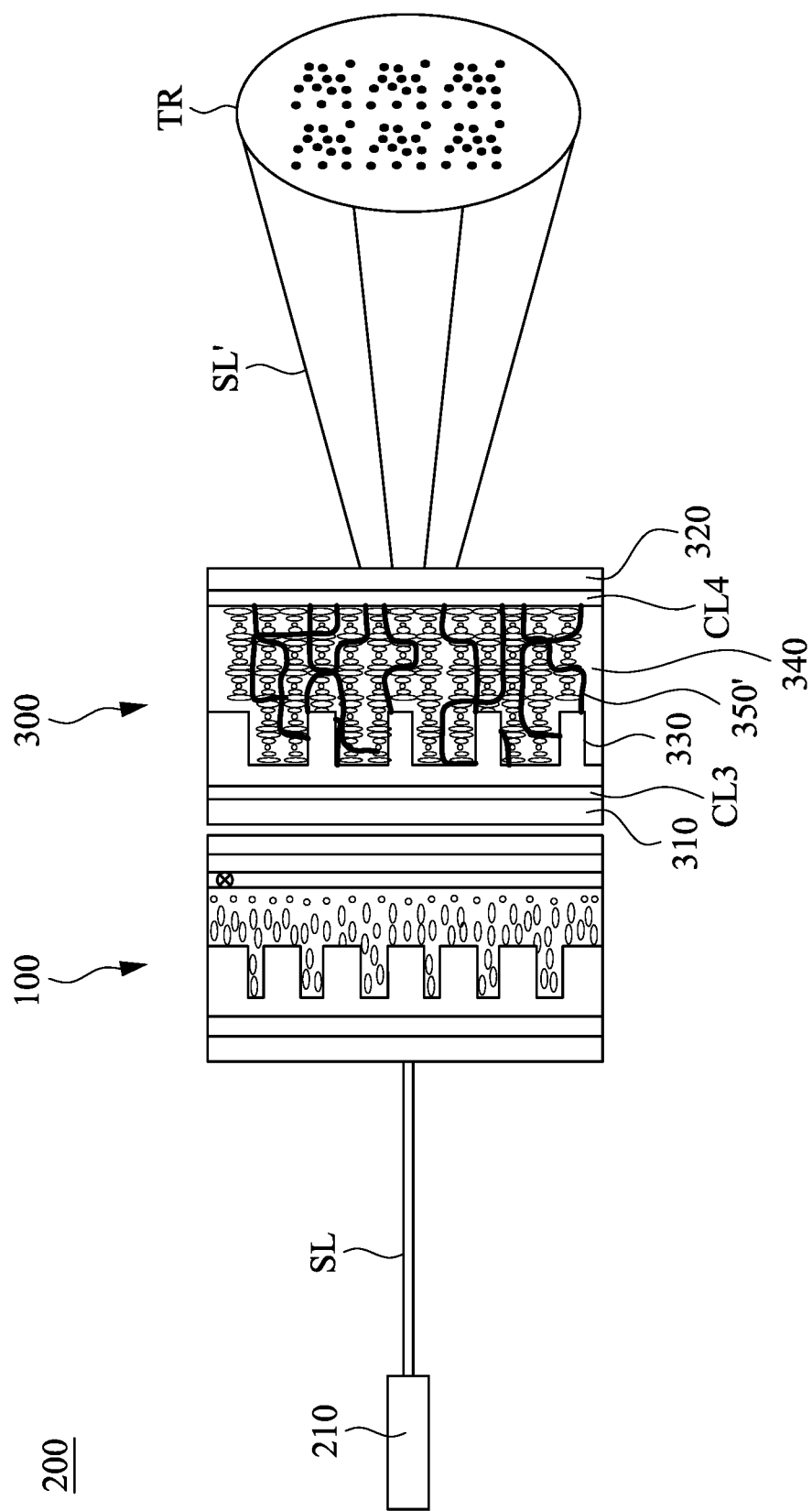

OPTICAL SURFACE MAPPING SYSTEM

BACKGROUND

Field of Invention

The present disclosure relates to a liquid crystal element and a projection device for projecting a structured light using the same.

Description of Related Art

Liquid crystals are widely used for optical devices due to the large electro-optic modulation resulting from the high optical anisotropy, the electrically tuning capability at low voltages, and the design flexibility on various substrates. For example, liquid crystal devices play an important role in many optical systems such as 3-dimensional (3D) displays, optical data storage, and optical communication systems by means of the change in the phase or the polarization state of light. Liquid crystal devices may serve as an optical diffraction element which may diffract light by several angles, thereby generating a diffraction pattern of light.

SUMMARY

According to one embodiment of the present disclosure, a liquid crystal element includes a substrate, a diffractive optical element layer, and a liquid crystal material. The diffractive optical element layer has an uneven surface. The liquid crystal material is between the substrate and the uneven surface. The liquid crystal material is disposed contiguously with the uneven surface.

In some embodiments of the present disclosure, the liquid crystal element further includes an alignment layer between the liquid crystal material and the substrate.

In some embodiments of the present disclosure, the liquid crystal element further includes an alignment layer between the diffractive optical element layer.

In some embodiments of the present disclosure, the liquid crystal material has a first effective refractive index at a first operating state of the liquid crystal element, and a difference between the first effective refractive index and a refractive index of the diffractive optical element layer is less than 0.1.

In some embodiments of the present disclosure, the liquid crystal material has a second effective refractive index at a second operating state of the liquid crystal element, and a difference between the second effective refractive index and the refractive index of the diffractive optical element layer is greater than 0.3.

In some embodiments of the present disclosure, the liquid crystal material has a second effective refractive index at a second operating state of the liquid crystal element, the second effective refractive index and the refractive index of the diffractive optical element layer has a first difference therebetween, the refractive index of the diffractive optical element layer and a refractive index of air has a second difference therebetween, and a difference between the first difference and the second difference is less than 0.1.

In some embodiments of the present disclosure, the diffractive optical element layer has a two-dimensional irregular pattern.

In some embodiments of the present disclosure, the liquid crystal element further includes a polymer, in which the liquid crystal material is dispersed in the polymer.

In some embodiments of the present disclosure, the liquid crystal element further includes a polymer network for stabilizing the liquid crystal material to form polymer stabilized cholesteric texture (PSCT).

In some embodiments of the present disclosure, the liquid crystal element further includes an electrode layer between the liquid crystal material and the substrate.

In some embodiments of the present disclosure, the liquid crystal element further includes a counter substrate and an electrode layer. The diffractive optical element layer is between the substrate and the counter substrate. The electrode layer is between the diffractive optical element layer and the counter substrate.

According to one embodiment of the present disclosure, a projection device for projecting a structured light is provided. The device includes a light source, a first liquid crystal element, and a second liquid crystal element. The light source is configured to provide a light to a target region. The first liquid crystal element includes a first diffractive optical element layer having a first uneven surface and a first liquid crystal material disposed contiguously with the first uneven surface of the first diffractive optical element layer. The second liquid crystal element includes a second diffractive optical element layer having a second uneven surface and a second liquid crystal material disposed contiguously with the second uneven surface of the second diffractive optical element layer. The first liquid crystal element is configured to receive the light from the light source and send the light to the second liquid crystal element. The second liquid crystal element is configured to receive the light from the first liquid crystal element and send the light to the target region. A pattern of the first uneven surface is different from a pattern of the second uneven surface.

In some embodiments of the present disclosure, the first liquid crystal element does not comprise a polymer in the first liquid crystal material, and the second liquid crystal element does not comprise a polymer in the second liquid crystal material.

In some embodiments of the present disclosure, at least one of the first and second liquid crystal elements further comprises a polymer in one of the first and second liquid crystal materials of said one of the first and second liquid crystal elements.

In some embodiments of the present disclosure, another one of the first and second liquid crystal elements does not comprise the polymer.

In some embodiments of the present disclosure, said one of the first and second liquid crystal materials is doped with a chiral dopant.

In some embodiments of the present disclosure, the first uneven surface of the first diffractive optical element layer is opposite to the light source.

In some embodiments of the present disclosure, the second uneven surface of the second diffractive optical element layer is opposite to the light source.

Based on the above description, one advantage is that at least two different diffraction patterns can be provided by one projection device, for example along the same axis, thereby improving 3D mapping application. Another advantage is that a projection device may be switched between transmissive and diffracting operating states or between diffusing and diffracting operating states, which may provide suitable light distribution to user.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 8 is a schematic view of a device for projecting structured light according to some embodiment of the disclosure;

DETAILED DESCRIPTION

Figure 1A:
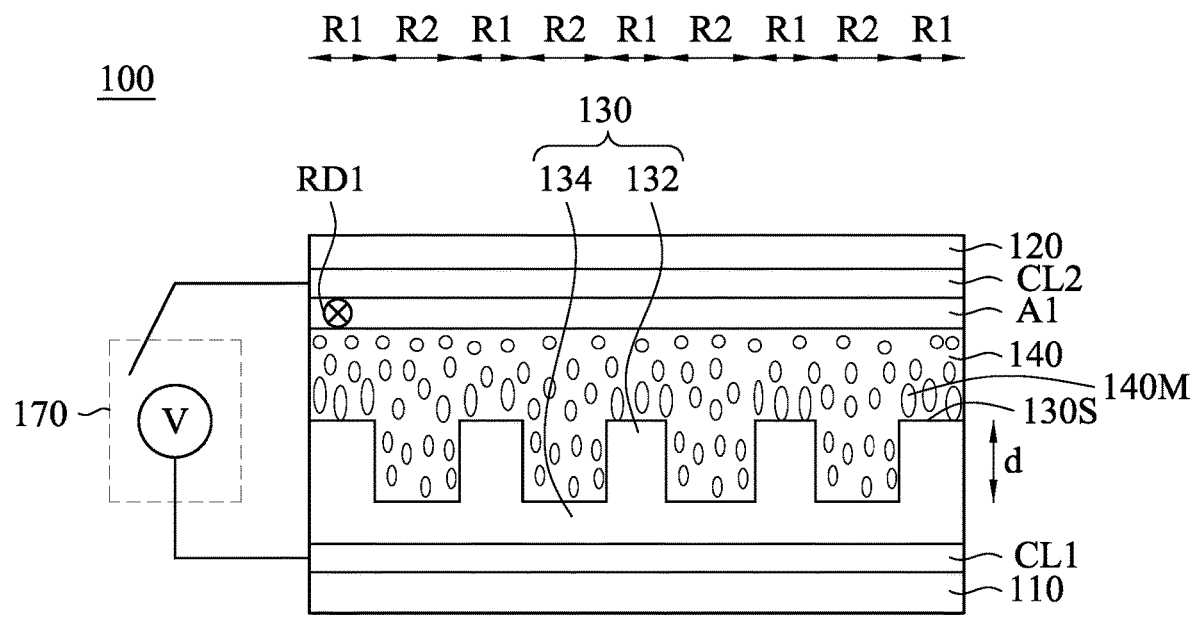
FIGS. 1A and 1B are a schematic cross-sectional views of a liquid crystal element according to some embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Diffractive optical elements (DOEs) may diffract a pattern light to form a projecting light with plural repeating patterns, in which each pattern projects onto a respective region of a surface so as to at least partially cover the surface, and the regions may tile the surface. The pattern projects onto an object for purposes of three-dimensional (3D) mapping. In the present patent application and in the claims, the term "3D map" (or equivalently, "depth map") refers to a set of 3D coordinates representing the surface of the object. The creation of such a map based on image data is referred to herein as "3D mapping" (or equivalently, "3D reconstruction").

FIG. 1A is a schematic cross-sectional view of a liquid crystal element 100 according to some embodiment of the disclosure. The liquid crystal element 100 includes substrates 110 and 120, a DOE layer 130, and a liquid crystal material 140. The substrates 110 and 120 are disposed opposite to each other. The DOE layer 130 and the liquid crystal material 140 are between the substrates 110 and 120. The DOE layer 130 has an uneven surface 130S facing the liquid crystal material 140. The liquid crystal material 140 is between the substrate 120 and the uneven surface 130S, and disposed contiguously with the uneven surface 130S.

The DOE layer 130 is made of an optically isotropic material, such as poly(methyl methacrylate) (PMMA), polycarbonate, or the like. That is, the refractive index of the DOE layer 130 is substantially the same in all directions.

The DOE layer 130 has plural protruding portions 132 and plural recessed portions 134. The top surface of the protruding portions 132 are at positions higher than that of the recessed portions 134, which results in the uneven surface 130S of the DOE layer 130. When light is incident from the substrate 110 toward to substrate 120, the DOE layer 130 provides an optical path difference to the incident light. For example, the optical path difference between positions of the protruding portions 132 and the recessed portions 134 is $(n_{DOE}-n_{air}) \times d$ when the surface 130S of the DOE layer 130 is exposed to air, in which $n_{DOE}$ is a refractive index of the DOE layer 130, $n_{air}$ is a refractive index of air, and d is the thickness difference between the thicknesses of the protruding portions 132 and the recessed portions 134.

The thickness difference d is designed such that the DOE layer 130 itself can provide suitable optical path difference to incident light, thereby realizing a diffraction effect. For example, by adjusting the thickness difference d, the optical path difference $(n_{DOE}-n_{air}) \times d$ may be designed to be about $((K-1)*\lambda/2+m\lambda)$, in which m is an integer, $\lambda$ is a wavelength of incident light, and K is the level of DOE. For example, the case here is a 2 level DOE, and the K is 2.

In the present embodiments, the protruding portions 132 may respectively have the same uniform thickness, and the recessed portions 134 may respectively have the same uniform thickness, thereby respectively providing uniform optical path. For example, the top surfaces of the portions 132 and 134 are substantially flat. However, in some other embodiments, the top surfaces of the protruding portions 132 and the recessed portions 134 may fluctuate due to fabrication error, such that the thickness of the protruding portions 132 may locally change, and the thickness of the recessed portions 134 may locally change.

Figure 1B:
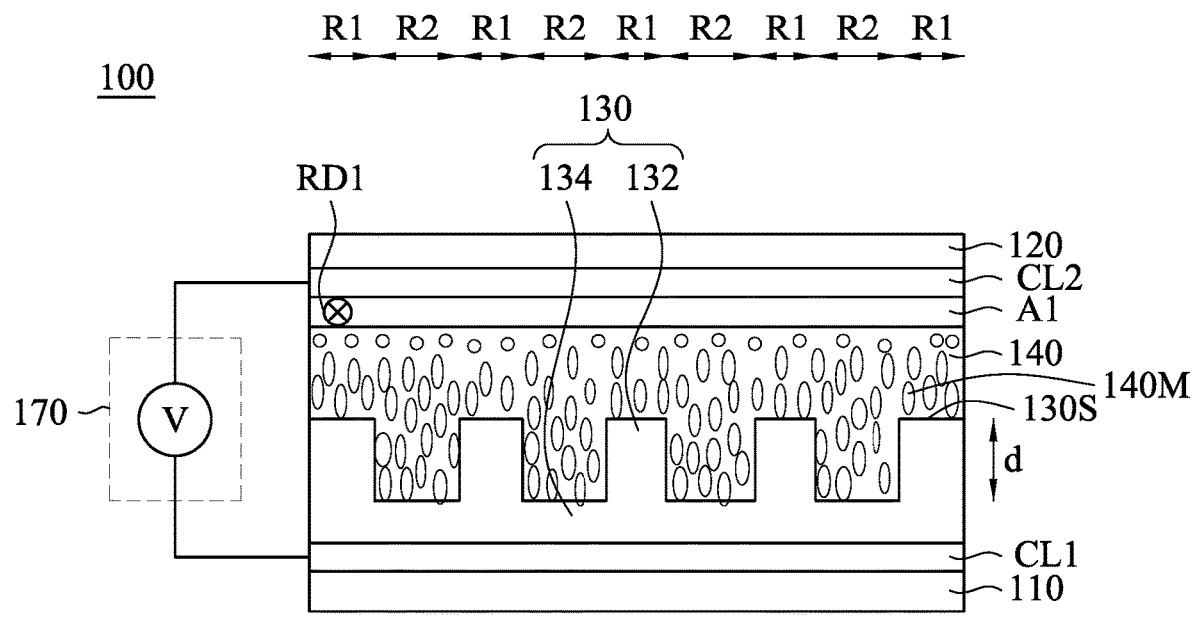
Figure 1C:
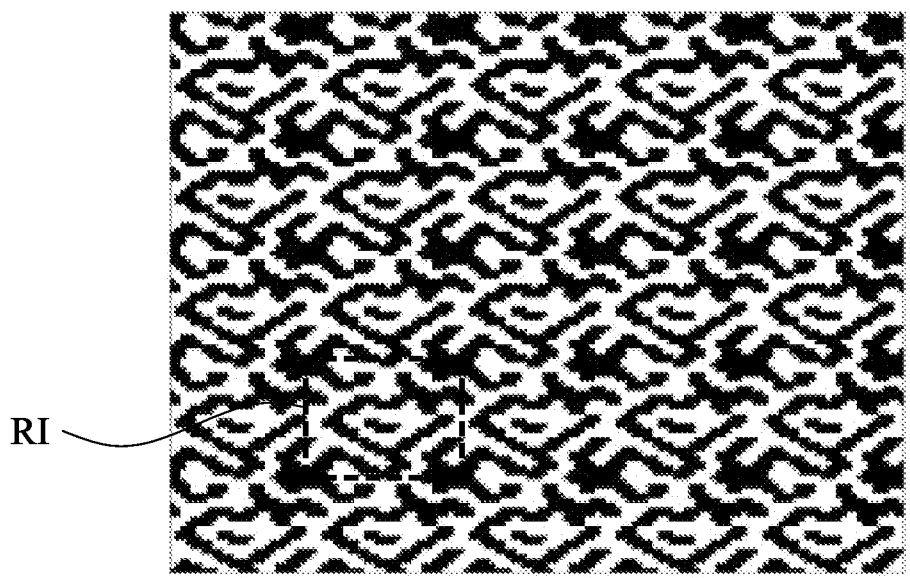
FIG. 1C is a schematic plane view of a diffractive optical element layer according to some embodiment of the disclosure.

FIG. 1C is a schematic plane view of the DOE layer 130 according to some embodiment of the disclosure. The DOE layer 130 has a two-dimensional pattern with dark and clear regions. The dark regions indicate positions of the protruding portions 132. The clear regions indicate positions of the recessed portions 134. The DOE layer 130 may include a plurality of repeating units RI including the protruding portions 132 and the recessed portions 134. The distribution of the dark regions and the clear regions may be calculated and designed according to desired projected light pattern, for example, by performing a iterative Fourier transform algorithm. The protruding portions 132 and the recessed portions 134 in each unit RI may be arranged irregularly according to desired fan-out angles, such that the DOE layer 130 may repeat the pattern of incident light at far-field with suitable fan-out angles, which may be used in 3D mapping application. In some other embodiments, the DOE layer 130 may also designed with suitable two-dimensional pattern, so as apply a desired pattern to input light, such as an uncorrelated pattern, which may be used in 3D mapping application. Such irregular arrangement of the portions 132 and the recessed portions 134 in each unit RI means that is primarily not have any regions mutually symmetrical in each unit RI.

Referring back to FIG. 1A, the liquid crystal material 140 includes plural liquid crystal molecules 140M. The liquid crystal material 140 may be nematic liquid crystal material, cholesteric liquid crystal material, or other suitable anisotropic materials. In some embodiments, the liquid crystal molecules 140M may orient their long axis according to adjacent surface conditions without the presence of electric field, and may be reoriented by electric field. The liquid crystal material 140 may be a negative liquid crystal material or a positive liquid crystal material. A negative liquid crystal exhibits a negative dielectric anisotropy, whereas a positive liquid crystal exhibits a positive dielectric anisotropy. The liquid crystal molecules 140M in a negative liquid crystal align perpendicularly to applied electric fields (i.e., the longitudinal axis of negative liquid crystal molecules 140M will orient perpendicular to applied electric fields. The liquid crystal molecules 140M in a positive liquid crystal align parallel to applied electric field (i.e., the longitudinal axis of positive liquid crystal molecules 140M will orient parallel to applied electric fields). In some other embodiments, the liquid crystal material 140 may include polymers for stabilizing the distribution of the liquid crystal material 140.

In some embodiments, the liquid crystal element 100 may further include an alignment layer A1 on a side of the liquid crystal material 140 facing the substrate 120. The alignment layer A1 has a suitable effect on the orientation of liquid crystal molecules 140M. For example, the alignment layer A1 may be rubbed for providing parallel alignment to the orientation of liquid crystal molecules 140M, in which a vector of a rubbing direction RD1 of the alignment layer A1 may point into the page as shown in the figure. In the present embodiments, the alignment layer A1 and may be made of polyimide or the like, which may provide parallel alignment to the orientation of liquid crystal molecules. In some embodiments, the surface 130S of the DOE layer 130 may have a suitable effect (e.g., vertical alignment as shown in FIG. 1A) on the orientation of liquid crystal molecules 140M. Through the configuration of the alignment layer A1 and the material of the DOE layer 130, the liquid crystal molecules 140M are arranged in a hybrid alignment in the present embodiments.

In some other embodiments, the liquid crystal molecules 140M may be arranged in parallel alignment, vertical alignment, dispersed in polymer, or other configurations. In some other embodiments, the surface 130S of the DOE layer 130 may be surface treated by ion beam, plasma, or other suitable method, such that the surface 130S of the DOE layer 130 may provide other suitable alignment (e.g., horizontal alignment or both horizontal and vertical alignments) on the orientation of liquid crystal molecules 140M. In some other embodiments, another alignment layer may be deposed on a side of the liquid crystal material 140 facing the substrate 110 and provide desired alignments (e.g., vertical or horizontal alignment) on the orientation of liquid crystal molecules 140M.

Referring back to FIG. 1A, the liquid crystal element 100 may further include conductive layers CL1 and CL2. The conductive layer CL1 is between the DOE layer 130 and the substrate 110. The conductive layer CL2 is between the liquid crystal material 140 and the substrate 120. The conductive layers CL1 and CL2 may be made of suitable transparent conductive materials, such as indium tin oxide (ITO). A controller 170 may be connected to the conductive layers CL1 and CL2 to provide suitable electric field (e.g., horizontal or vertical electric field) to modulate the liquid crystal material 140. For example, herein, the conductive layers CL1 and CL2 are can be applied with two different voltage, thereby generating vertical electric field across the hybrid alignment liquid crystal material 140. In another example, the conductive layers CL1 and CL2 are patterned to plural electrodes, and the electrodes of one of the conductive layers CL1 and CL2 can be applied with two different voltage, thereby generating horizontal electric field. In some other embodiments where a horizontal electric field is to be generated, one of the conductive layers CL1 and CL2 may be omitted.

The liquid crystal molecules 140M can be reoriented in response to the electric field across the liquid crystal material 140. As shown in FIG. 1B, the liquid crystal molecules 140M (which are arranged in a hybrid alignment in FIG. 1A) are reoriented in a vertical direction in response to a vertical electric field. The liquid crystal material 140 may have different effective refractive indexes in response to different electric fields. For example, the liquid crystal element 100 has a diffraction operating state where the liquid crystal material 140 has an effective refractive indexes $n_1$ and a transmissive operating state where the liquid crystal material 140 has an effective refractive index $n_2$ in response to the different electric fields, respectively.

At the diffraction operating state, as shown in FIG. 1B, the conductive layers CL1/CL2 are applied with suitable different voltages to generate an electric field across the liquid crystal material 140. A difference between the effective refractive index $n_1$ of the liquid crystal material 140 under the electric field and the refractive index $n_{DOE}$ of the DOE layer 130 is greater than 0.3. The refractive index difference $(n_1-n_{DOE})$ results in optical path difference at different positions of the liquid crystal element 100 (e.g., regions R1 and R2), thereby realizing diffraction effect. In some embodiments, the optical path difference $(n_1-n_{DOE}) \times d$ between the regions R1 and R2 is designed to be similar to the optical path difference $(n_{DOE}-n_{air}) \times d$ of the DOE layer 130 itself when the uneven surface 130S of the DOE layer 130 is exposed to air. For example, a difference between the value $(n_1-n_{DOE})$ and the value $(n_{DOE}-n_{air})$ may be designed to be less than 0.1. In some embodiments, the optical path difference $(n_1-n_{DOE}) \times d$ may be designed to be about $(\lambda/2+p\lambda)$, in which p is an integer. The optical path difference $(n_1-n_{DOE}) \times d$ may be further expanded to $((K-1)*\lambda/2+p\lambda)$, in which K is the level of the DOE layer 130. The case here is a 2 level DOE, and K is 2 herein. Through the design, a zero-order diffraction spot is reduced or eliminated, and the liquid crystal element 100 may diffract the incident light with suitable fan-out angle or apply a clear diffraction pattern to the incident light.

At the transmissive operating state, as shown in FIG. 1A, the electric field is turned off (e.g., the conductive layers CL1 and CL2 are floating or applied with the same voltage), little or no electric field is generated across the liquid crystal material 140. A difference between the effective refractive index $n_2$ of the liquid crystal material 140 and the refractive index $n_{DOE}$ of the DOE layer 130 is designed to be than 0.1. The optical path difference $(n_2-n_{DOE}) \times d$ at different positions of the liquid crystal element 100 (e.g., the regions R1 and R2) is designed to be about zero or $q\lambda$, in which q is an integer. Through the design, a light passing through the liquid crystal element 100 may maintain itself without being diffracted. That is, the liquid crystal element 100 is transparent to the incident light.

Herein, the liquid crystal element 100 is illustrated as normally transmissive, but it should not limit the scope of the present disclosure, and in some other embodiments, the liquid crystal element 100 may be normally diffractive. That is, in some other embodiments, when the electric field is turned off (e.g., the conductive layers CL1 and CL2 are floating or applied with the same voltage), the liquid crystal element 100 is at the diffraction operating state; and when the conductive layers CL1/CL2 are applied with suitable different voltages, the liquid crystal element 100 is at the transmissive operating state.

Figure 2:
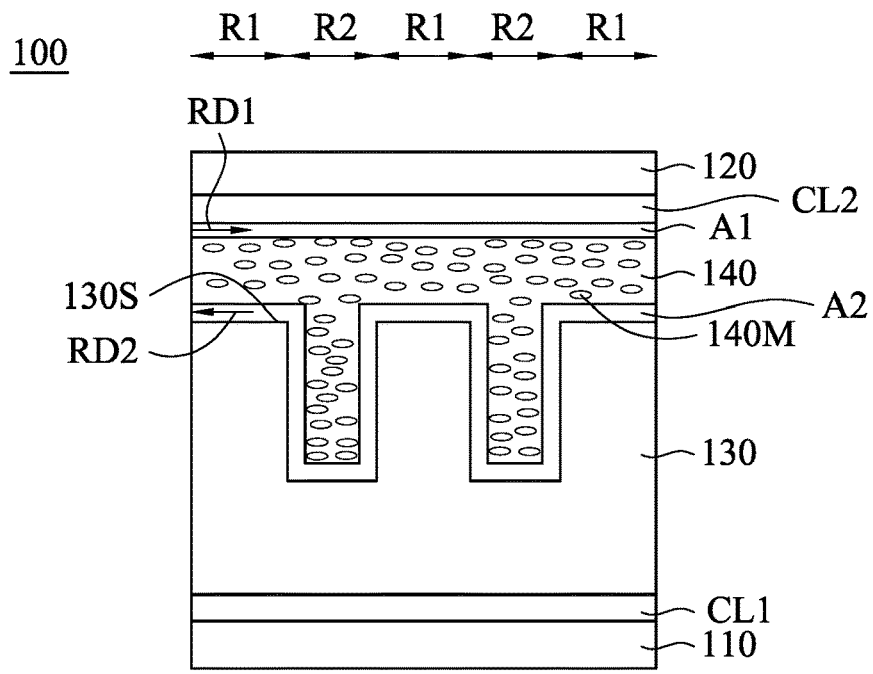
FIG. 2 is a schematic cross-sectional view of a liquid crystal element according to some embodiment of the disclosure.

FIG. 2 is a schematic cross-sectional view of a liquid crystal element 100 according to some embodiment of the disclosure. The present embodiments are similar to those illustrated in FIG. 1A, and the difference between the present embodiments and the embodiments illustrated in FIG. 1A is at least: the liquid crystal element 100 may further include an alignment layer A2 on a side of the liquid crystal material 140 facing the substrate 110. The alignment layers A1 and A2 arrange the liquid crystal molecules 140M in a parallel alignment in the present embodiments. The alignment layers A1 and A2 are rubbed for providing parallel alignment to the orientation of liquid crystal molecules, in which a vector of a rubbing direction RD1 of the alignment layer A1 and a vector of a rubbing direction RD2 of the alignment layer A2 may point toward opposite sides. In the present embodiments, the alignment layers A1 and A2 and may be made of polyimide (PI) or the like, which may provide parallel alignment to the orientation of liquid crystal molecules. Other details of the present embodiments are similar to those aforementioned, and not repeated herein.

Figure 3:
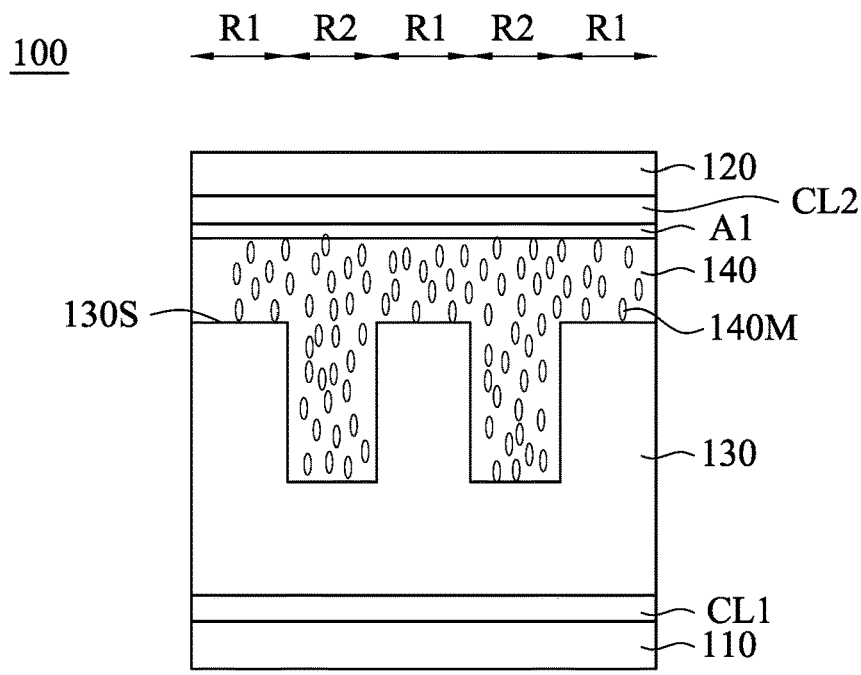
FIG. 3 is a schematic cross-sectional view of a liquid crystal element according to some embodiment of the disclosure.

FIG. 3 is a schematic cross-sectional view of a liquid crystal element 100 according to some embodiment of the disclosure. The present embodiments are similar to those illustrated in FIG. 1A, and the difference between the present embodiments and the embodiments illustrated in FIG. 1A is at least: the alignment layer A1 may provide vertical alignment to the orientation of liquid crystal molecules. The alignment layer A1 and the surface 130S arrange the liquid crystal molecules in a vertical alignment in the present embodiments. In the present embodiments, the alignment layer A1 may be made of $SiO_2$ or the like, which may provide vertical alignment to the orientation of liquid crystal molecules. Other details of the present embodiments are similar to those aforementioned, and not repeated herein.

Figure 4:
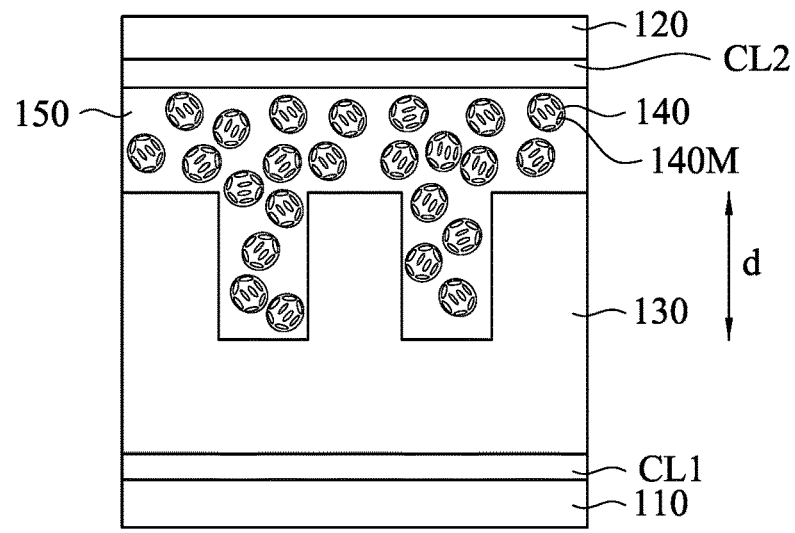
FIG. 4 is a schematic cross-sectional view of a liquid crystal element according to some embodiment of the disclosure.

FIG. 4 is a schematic cross-sectional view of a liquid crystal element 100 according to some embodiment of the disclosure. The present embodiments are similar to those illustrated in FIG. 1A, and the difference between the present embodiments and the embodiments illustrated in FIG. 1A is at least: the liquid crystal element 100 further includes a polymer 150. For example, nematic liquid crystal molecules 140M of the liquid crystal material 140 are dispersed in the polymer 150, which may be referred to as polymer dispersed liquid crystal (PDLC). Since surface condition has little effect on PDLC, the alignment layers (e.g., the layer A1 in FIG. 1A) may be omitted in the present embodiments.

In the present embodiments, the liquid crystal material 140 may have different effective refractive indexes in response to different electric fields, such that the liquid crystal element 100 may have a diffraction operating state and a diffusing operating state in response to different electric fields across the liquid crystal material 140. For clear illustration, the liquid crystal material 140 and the polymer 150 has an effective refractive indexes $n_1'$ at the diffraction operating state, and the liquid crystal material 140 and the polymer 150 has an effective refractive index $n_2'$ at the diffusing operating state.

At the diffraction operating state of the liquid crystal element 100, the conductive layers CL1/CL2 are applied with suitable different voltages to generate electric field across the liquid crystal material 140. The liquid crystal element 100 has an optical path difference at different positions (e.g., regions R1 and R2). For example, the liquid crystal element 100 may provide an optical path difference of $((K-1)*\lambda/2+p\lambda)$ at different positions (e.g., regions R1 and R2), in which K is the level of DOE. The case here is a 2 level DOE, and K may be 2. A difference between the effective refractive index $n_1'$ of the liquid crystal material 140 and the polymer 150 under the electric field and the refractive index $n_{DOE}$ of the DOE layer 130 is greater than 0.3. The refractive index difference $(n_1'-n_{DOE})$ results in optical path difference at different positions of the liquid crystal element 100 (e.g., regions R1 and R2), thereby realizing diffraction effect. In some embodiments, for reducing or eliminating zero order, the optical path difference $(n_1'-n_{DOE})\times d$ between the regions R1 and R2 is designed to be similar to the optical path difference $(n_{DOE}-n_{air})\times d$ of the DOE layer 130 itself when the uneven surface 130S of the DOE layer 130 is exposed to air. For example, a difference between the value $(n_1'-n_{DOE})$ and the value $(n_{DOE}-n_{air})$ may be designed to be less than 0.1. In some embodiments, the optical path difference $(n_1'-n_{DOE})\times d$ may be designed to be about $((K-1)*\lambda/2+p\lambda)$, in which p is an integer, and K is the level of DOE. The case here is a 2 level DOE, and K may be 2. In such embodiments, the DOE layer 130 is designed with suitable pattern for achieving destructive interference thereby reducing or eliminating zero order. For example, the DOE layer 130 include a repeat of equal-width stripes of zero and p phase levels, in which the field contributions from both phase levels are equal and 180° out of phase, so the destructive interference is complete. Through the design, a zero-order diffraction spot is reduced or eliminated, a light passing through the liquid crystal element 100 may diffract the incident light with suitable fan-out angle or apply a clear diffraction pattern to the incident light.

In some embodiments, the refractive index of the polymer 150 may be in a range from about 1.3 to about 2.5 depending on materials, and the effect refractive index of liquid crystal material 140 may be in a range from about 1.3 to about 2.5 depending on materials. In some embodiments, for reducing scattering effect, a refractive index of the polymer 150 and the effect refractive index of liquid crystal material 140 at the diffraction operating state may be designed to be less than 0.1. For example, a refractive index of the polymer 150 is about 1.5, and the effect refractive index of liquid crystal material 140 at the diffraction operating state is about 1.5 by applying suitable voltages on the conductive layers CL1 and CL2.

At the diffusing operating state, the electric field is turned off (e.g., the conductive layers CL1 and CL2 are floating or applied with the same voltage), the liquid crystal molecules 140M of the liquid crystal material 140 are randomly dispersed and optically isotropic. A refractive index of the polymer 150 is mismatched from the effect refractive index of liquid crystal material 140, such that boundaries between the polymer 150 and the liquid crystal material 140 may scatter and diffuse the incident light, and light may be projected to the target region as a surface source. For example, a refractive index of the polymer 150 is about 1.5, and the effect refractive index of liquid crystal material 140 is about 1.7.

Herein, the liquid crystal element 100 is illustrated as normally scattering/diffusing, but it should not limit the scope of the present disclosure, and in some other embodiments, the liquid crystal element 100 may be normally diffractive. That is, in some other embodiments, when the electric field is turned off (e.g., the conductive layers CL1 and CL2 are floating or applied with the same voltage), the liquid crystal element 100 is at the diffraction operating state; and when the conductive layers CL1/CL2 are applied with suitable different voltages, the liquid crystal element 100 is at the diffusing operating state. Other details of the present embodiments are similar to those aforementioned, and not repeated herein.

Figure 5:
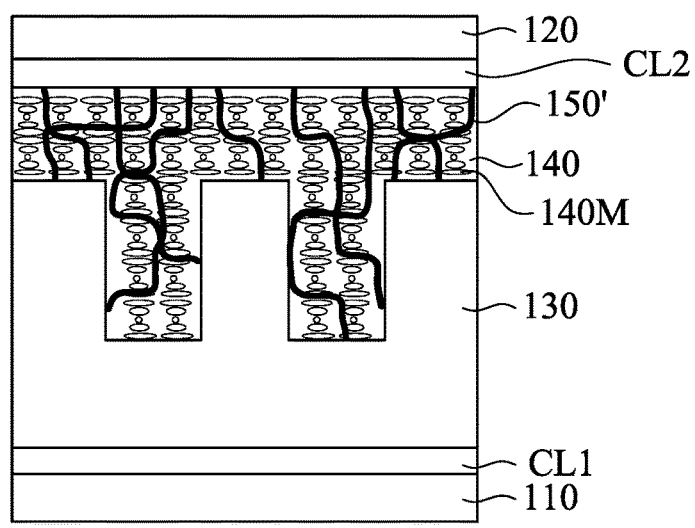
FIG. 5 is a schematic cross-sectional view of a liquid crystal element according to some embodiment of the disclosure.

FIG. 5 is a schematic cross-sectional view of a liquid crystal element 100 according to some embodiment of the disclosure. The present embodiments are similar to those illustrated in FIG. 4, and the difference between the present embodiments and the embodiments illustrated in FIG. 4 is at least: the liquid crystal material 140 (e.g., nematic liquid crystal molecules 140M) is doped with chiral dopant. The naturally twisted orientation of the chiral dopant may bias the nematic liquid crystal molecules 140M toward a twisted state. In the present embodiments, the liquid crystal element 100 further includes a polymer network 150' for stabilizing the liquid crystal material 140 to form polymer stabilized cholesteric texture (PSCT). Alignment layers (e.g., the layer A1 in FIG. 1A) may be omitted in the present embodiments. Other details of the present embodiments are similar to those aforementioned, and not repeated herein.

Figure 6A:
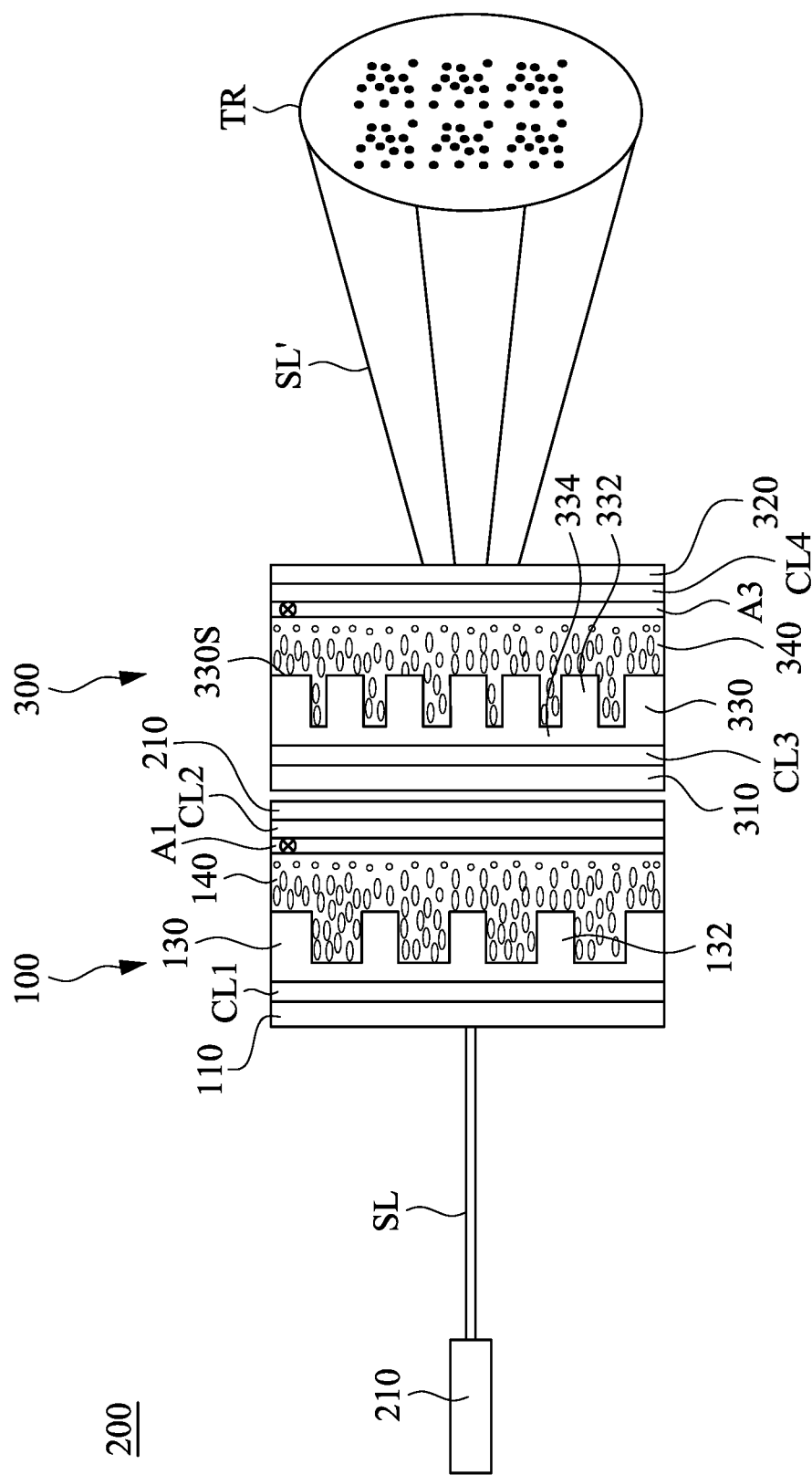
FIG. 6A is a schematic view of a device for projecting structured light according to some embodiment of the disclosure.

FIG. 6A is a schematic view of a projection device 200 for projecting structured light SL' according to some embodiment of the disclosure. The projection device 200 includes a light source 210, the liquid crystal element 100, and a liquid crystal element 300. The light source 210 is configured to provide a light SL with a dotted light pattern to a target region TR. To be specific, the light source 210 may include an emitter array, in which the emitter array includes plural emitters on a single/monolithic substrate and is configured to emit plural beams of light SL. Each emitter may be a laser diode or solid-state laser made by a semiconductor fabrication process. The emitters emit light with certain characteristics, such as polarization, range of wavelengths, amplitude, temporal modulation, some other feature that describes emitted light, intensity, or some combination thereof. In some embodiments, the plural emitters all have the same characteristics. In other embodiments, one or more of the characteristics may be different in each emitter from other emitters in the light source 210. Example bands of the beams of the light SL emitted by the emitters include: a visible band (e.g., about 380 nm to about 750 nm), an infrared (IR) band (e.g., about 750 nm to about 1500 nm), an ultraviolet band (e.g., about 100 nm to about 380 nm), other suitable electromagnetic spectrum, or the combination thereof.

For example, the light source 210 may include a Vertical Cavity Surface Emitting Laser (VCSEL) array, which includes plural VCSEL emitters providing plural collimated beams. The VCSEL emitters are arranged in suitable distribution, such that the collimated beams form a dotted light pattern. In some other embodiments, the light source 210 may be an Edge Emitting Laser (EEL) and a suitable pattern generator (e.g., an DOE or an), the pattern generator applies a pattern to a beam provided by the EEL, thereby forming the light SL including the dotted light pattern. In some embodiments, the liquid crystal elements 100 is configured to receive the light SL from the light source 210 and send the light SL to the liquid crystal element 300. The liquid crystal element 300 is configured to receive the light SL from the liquid crystal element 100 and send the light SL' to the target region TR. The projection device 200 may further includes other optical components, such as lens, filter, polarizer, etc.

The configuration of the liquid crystal element 300 may similar to the aforementioned liquid crystal element 100. For example, the liquid crystal element 300 includes a DOE layer 330 having an uneven surface 330S and a liquid crystal material 340 disposed contiguously with the uneven surface 330S of the DOE layer 330. Similar with the DOE layer 130, the DOE layer 330 is made of an optically isotropic material, such as poly(methyl methacrylate) (PMMA), polycarbonate, or the like. That is, the refractive index of the DOE layer 330 is substantially the same in all directions. Other details of the DOE layer 330 are similar to the DOE layer 130, and therefore not repeated herein. The liquid crystal element 300 may further include substrates 310 and 320, alignment layer A3, and conductive layers CL3 and CL4, which are similar to the substrates 110 and 210, alignment layer A1, and conductive layers CL1 and CL2 of the liquid crystal element 100, respectively, and therefore not repeated herein.

Figure 6B:
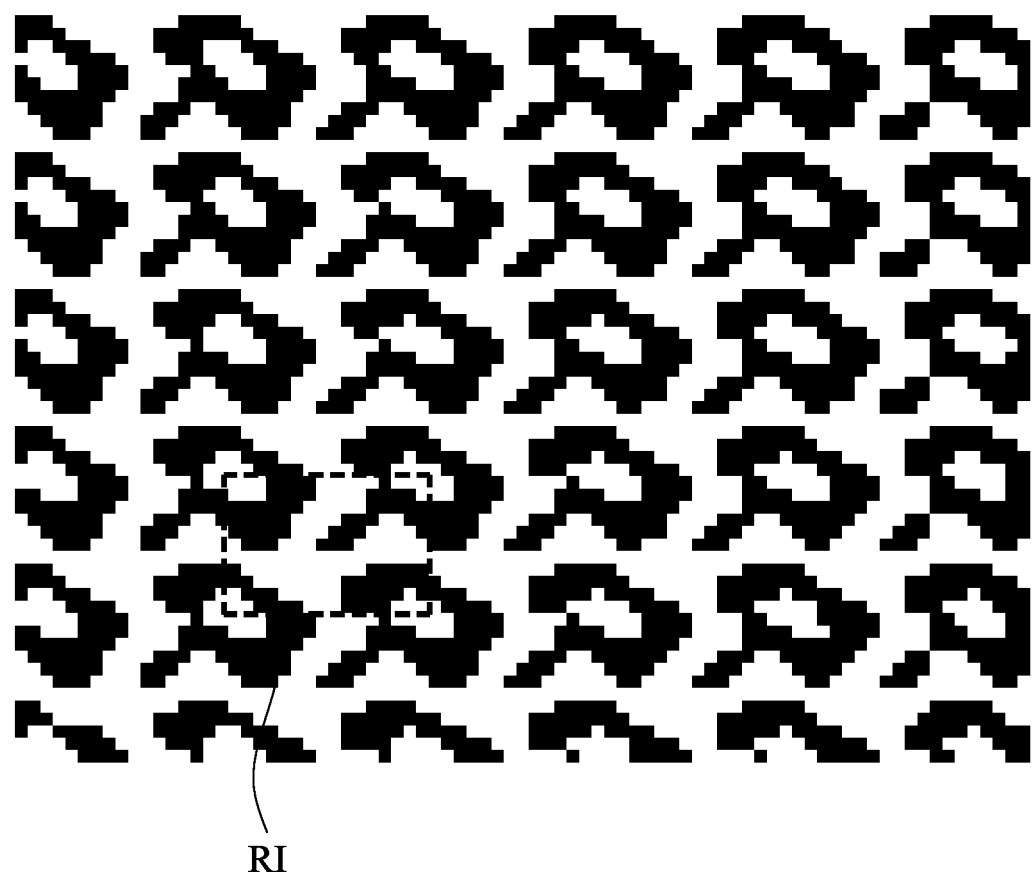
FIG. 6B is a schematic plane view of a diffractive optical element layer according to some embodiment of the disclosure.

In some embodiments, a pattern of the uneven surface 130S is different from a pattern of the uneven surface 330S. For example, herein, a pitch between the protruding portions 132 of the DOE layer 130 is different from a pitch between the protruding portions 332 of the DOE layer 330. To be specific, FIG. 6B is a schematic plane view of the DOE layer 330 according to some embodiment of the disclosure. The dark regions and clear regions indicate positions of the protruding portions 332 and the recessed portions 334, respectively, and the distribution of the dark regions and clear regions in FIG. 6B is different from that in FIG. 1C, which is the schematic plane view of the DOE layer 130. The liquid crystal elements 100 and 300 may repeat the pattern of light SL at far-field and spread output the pattern apart with suitable fan-out angles, resulting the projecting structured light SL'. In some embodiments, the fan-out angle of the pattern that the DOE layer 330 applies input light may be different from that of the pattern that the DOE layer 130 applies to the input light, which results in different field of views (FOVs) of the projection device 200.

Herein, the uneven surface 130S of the DOE layer 130 and the uneven surface 330S of the DOE layer 330 are opposite to the light source 210. Through the configuration, light SL enters the DOE layers 130 and 330 by flat surfaces of the DOE layers 110 and 130 and exits the DOE layers 130 and 330 by the uneven surfaces 130S and 330S. However, it should not limit the scope of the present disclosure. In some other embodiments, the uneven surface 130S of the DOE layer 110 and the uneven surface 330S of the DOE layer 330 faces the light source 210, such that light LS may enter the DOE layers 110 and 130 by the uneven surfaces 130S and 330S and exits the DOE layers 110 and 130 by the flat surfaces of the DOE layers 110 and 130. In still other embodiments, the uneven surface 130S of the DOE layer 110 is opposite to the light source 210, and the uneven surface 330S of the DOE layers 330 faces the light source 210. In still other embodiments, the uneven surface 130S of the DOE layer 110 faces the light source 210, and the uneven surface 330S of the DOE layer 330 is opposite to the light source 210.

Figure 6C:
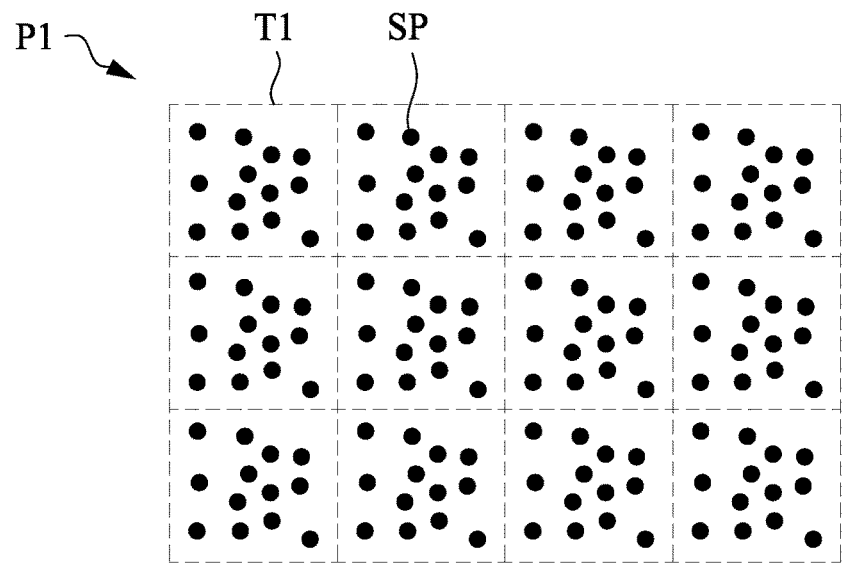
FIGS. 6C-6D illustrates diffraction patterns of structured light according to some embodiment of the disclosure.
Figure 6D:
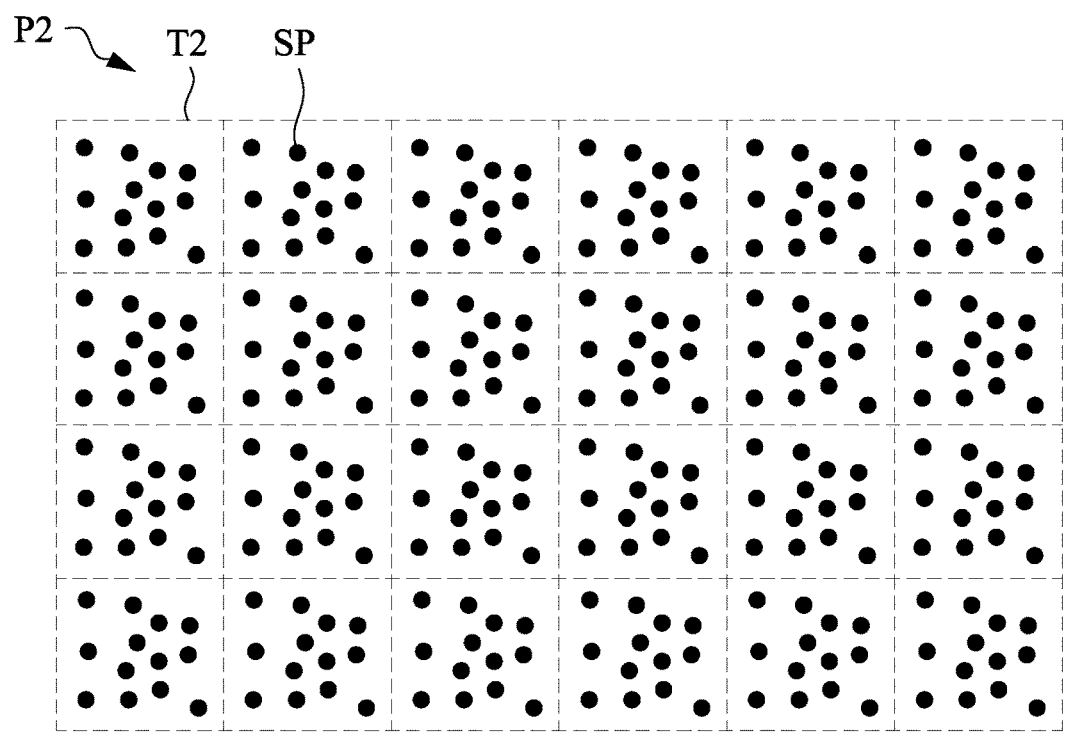

FIGS. 6C-6D illustrates diffraction patterns of structured light at first and second stages of the projection device 200 according to some embodiment of the disclosure. In FIG. 6C, at first stage of the device 200, the liquid crystal element 100 is at diffraction operating state, and the liquid crystal element 300 is at transmissive operating state. Reference is made to both FIGS. 6A and 6C. The light SL with the light pattern is diffracted by the liquid crystal element 100, and then passing through the liquid crystal element 300, such that the light SL' exiting the projection device 200 is projected as a diffraction pattern P1 to the target region TR. The diffraction pattern P1 includes a plurality of tiles T1, each tile T1 includes a predefined distribution of light spots SP on a dark background (with light and dark reversed in the figure for clarity of representation) corresponding to the incident light pattern. The DOE layers 130 is designed so that tiles T1 precisely a plane of the target region TR. In other words, the tiles T1 meet along their edges without substantial gaps or overlap.

In FIG. 6D, at second stage of the device 200, the liquid crystal element 100 is at transmissive operating state, and the liquid crystal element 300 is at diffraction operating state. Reference is made to both FIGS. 6A and 6D. The light SL with the light pattern passes through the liquid crystal element 100, and then is diffracted by the liquid crystal element 300, such that the light SL' exiting the projection device 200 is projected as a diffraction pattern P2 to the target region TR. The diffraction pattern P2 includes a plurality of tiles T2, each tile T2 includes a predefined distribution of light spots SP on a dark background (with light and dark reversed in the figure for clarity of representation) corresponding to the incident light pattern. Also, the DOE layers 330 is designed so that tiles T2 precisely the plane of the target region TR.

The projection device 200 may provide structured lights with the diffraction patterns P1 and P2 in FIGS. 6C and 6D, for example, for purposes of 3D mapping application, such as face recognition. For example, when the object is far from a detector, the device 200 may provide the diffraction pattern P1 in FIG. 6C, which has small field of view (FOV). In contrast, when the object is near the detector, the device 200 may provide the diffraction pattern P2 in FIG. 6D, which has large FOV.

In the present embodiments, the light pattern of the light SL provided by the light source 210 (e.g., the VCSEL) at the first and second stages of the projection device 200 remains the same, such that the spots SP in the tiles T1 and T2 of the diffraction patterns P1 and P2 of in FIG. 6C and 6D are arranged in the same distribution. In some other embodiments, the light pattern of the light SL provided by the light source 210 (e.g., the VCSEL) at the first and second stages of the projection device 200 may be different, such that the spots SP in the tiles T1 and T2 in FIG. 6C and 6D may be different. For example, the VCSEL light source 210 may have plural first sub-light sources and plural second sub-light sources arranged at different positions, and the first and second sub-light sources are controlled to operate at different stages, such the first sub-light sources of the VCSEL light source 210 provides the light SL with a first light pattern at the first stage of the projection device 200, while the second sub-light sources of the VCSEL light source 210 provides the light SL with a second light pattern different from the first light pattern at the second stage of the projection device 200.

In the specification and in the claims of the present patent application, a "tiling" of a region (whether a planar region or a region in space) with a pattern means that the region is covered by multiple adjacent instances ("tiles") of the pattern, without substantial overlaps or gaps between the instances. When the pattern is made up of spots, as in the embodiments shown, "substantial" means that the gaps and overlap between adjacent tiles are no greater than a small, predetermined number times the average dimension of the spots in the pattern. The number depends on application requirements, and is typically between one and five. In embodiments of the present invention that are described hereinbelow, appropriate design and fabrication of the DOEs can yield tiling with gaps and/or overlap no greater than twice the average spot dimension, or even no greater than the average spot dimension itself.

In some embodiments, the light pattern of the incident light SL generated from the light source 210 may be uncorrelated pattern. In the context of the present patent application and in the claims, the term "uncorrelated pattern" refers to a projected pattern of spots (which may be bright or dark), whose positions are uncorrelated in planes transverse to the projection beam axis. The positions are uncorrelated in the sense that the auto-correlation of the pattern as a function of transverse shift is insignificant for any shift larger than the spot size and no greater than the maximum shift that may occur over the range of depths mapped by the system. Random and pseudo-random patterns are uncorrelated in this sense. Synthetic patterns, created by human or computer design, such as quasi-periodic patterns, may also be uncorrelated to the extent specified by the above definition.

In some further embodiments, the device 200 may operate at a third stage where the liquid crystal elements 100 and 300 are both at diffraction operating state. The light SL is diffracted by the liquid crystal element 100, then further diffracted by the liquid crystal element 300, and then projected to the target region TR. In some other embodiments, the light SL may be provided as a beam without light pattern, the liquid crystal element 100 may serve as a pattern generator to apply pattern to the light SL, and the liquid crystal element 300 may diffract the patterned light SL at a suitable fan-out angle at far-field.

In some further embodiments, the device 200 may operate at a fourth stage where the liquid crystal elements 100 and 300 are both at transmissive operating state. The light SL passes through the liquid crystal element 100 and the liquid crystal element 300, and then is projected to the target region TR.

Figure 7:
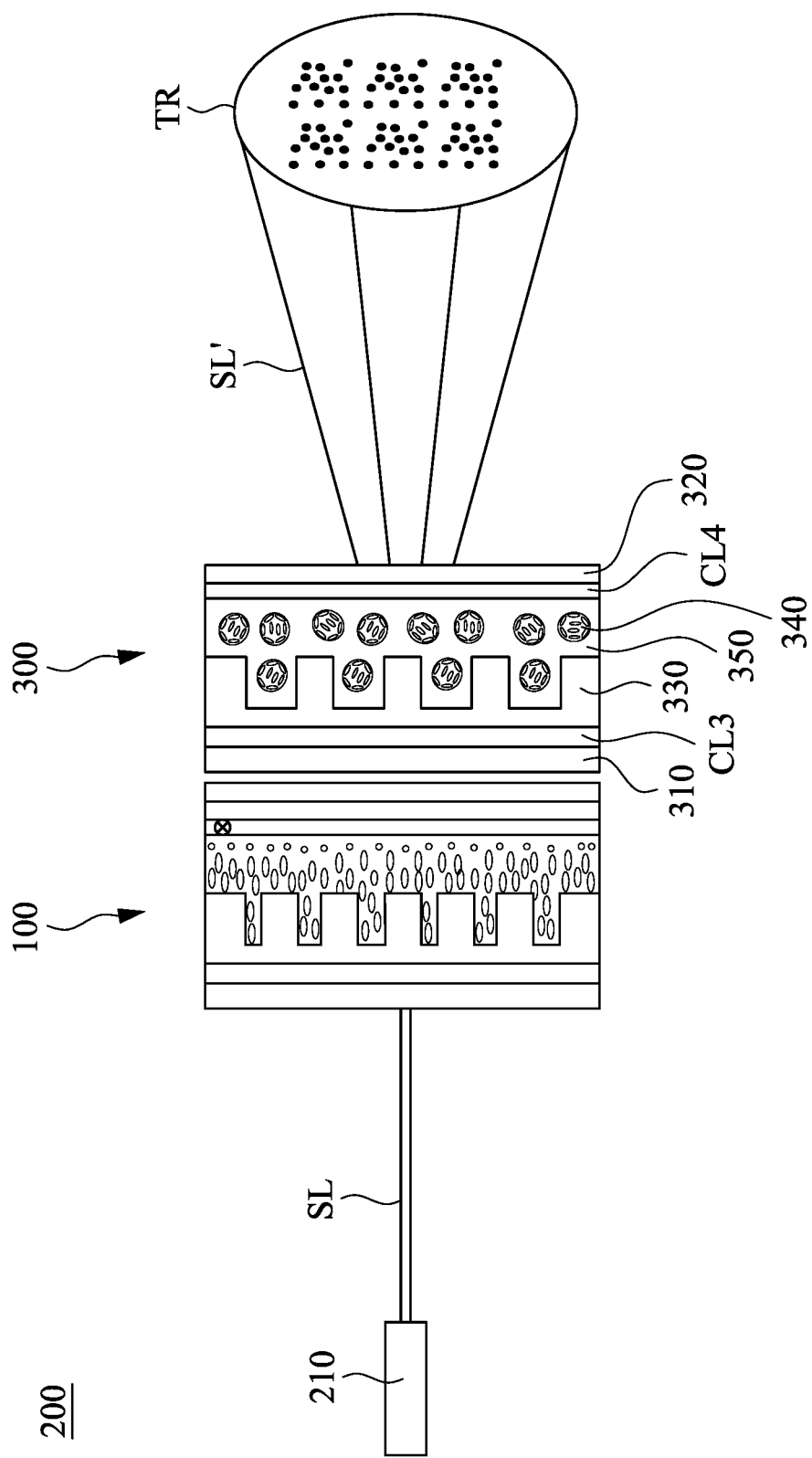
FIG. 7 is a schematic view of a device for projecting structured light according to some embodiment of the disclosure.

FIG. 7 is a schematic view of a device 200 for projecting structured light according to some embodiment of the disclosure. The present embodiments are similar to those illustrated in FIG. 6A, and the difference between the present embodiments and the embodiments illustrated in FIG. 6A is at least: the liquid crystal material 340 is dispersed in polymer 350. The device 200 is used for generating diffraction pattern at a first stage, and generating scattering and diffusing light at a second stage.

At the first stage of the device 200, the liquid crystal element 100 is at transmissive operating state, and the liquid crystal element 300 is at the diffraction operating state. The light SL passes through the liquid crystal element 100, then is diffracted by the liquid crystal element 100, and projected to the target region TR.

At the second stage of the device 200, the liquid crystal element 100 is at transmissive operating state, and the liquid crystal element 300 is at the diffusing operating state. The light SL passes through the liquid crystal element 100, then is scattered and diffused by the liquid crystal element 100, and projected to the target region TR.

In some further embodiments, the device 200 may operate at a third stage where the liquid crystal element 100 and the liquid crystal element 300 are both at the diffraction operating state. The light SL is diffracted by the liquid crystal element 100, then further diffracted by the liquid crystal element 300, and then projected to the target region TR. In some other embodiments, the light SL may be provided as a beam without light pattern, the liquid crystal element 100 may serve as a pattern generator to apply pattern to the light SL, and the liquid crystal element 300 may diffract the patterned light SL at a suitable fan-out angle at far-field.

In some further embodiments, the device 200 may operate at a fourth stage where the liquid crystal element 100 is at diffraction operating state, and the liquid crystal element 300 is at the diffusing operating state. The light SL is diffracted by the liquid crystal element 100, then further scattered and diffused by the liquid crystal element 100, and then projected to the target region TR.

FIG. 8 is a schematic view of a device 200 for projecting structured light according to some embodiment of the disclosure. The present embodiments are similar to those illustrated in FIG. 7, and the difference between the present embodiments and the embodiments illustrated in FIG. 7 is at least: a polymer network 350' is used for stabilizing the liquid crystal material 340. The liquid crystal material 340 is PSCT, rather than PDLC. Other details of the present embodiments are similar to those aforementioned, and not repeated herein.

Figure 9C:
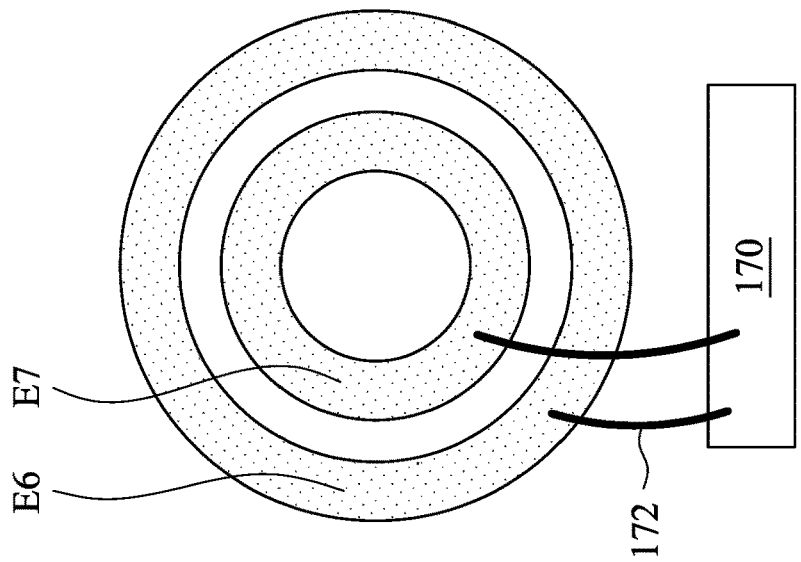
FIGS. 9A-9C illustrates top views of the patterned transparent conductive layer according to various examples.
Figure 9B:
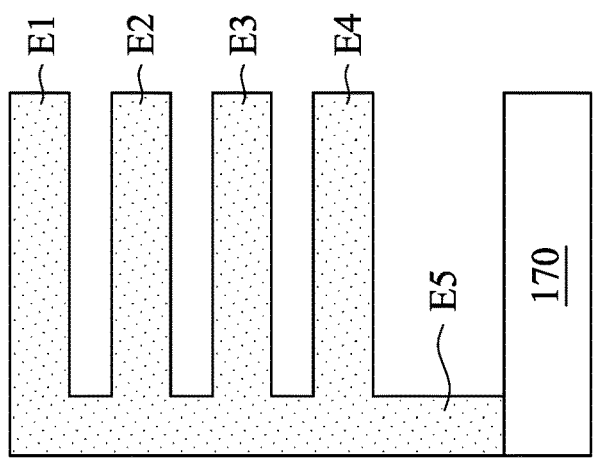
Figure 9A:
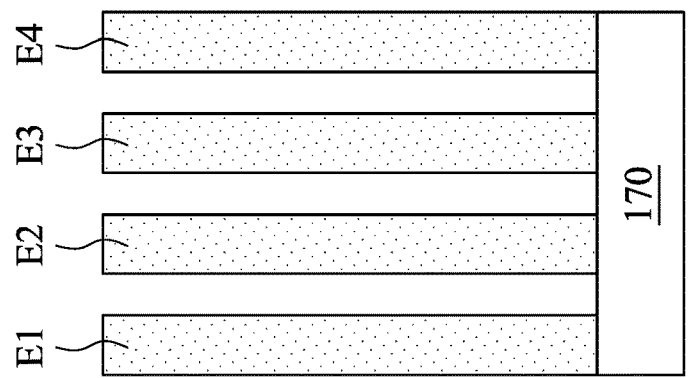

FIGS. 9A-9C illustrates top views of the patterned transparent conductive layer CL1/CL2 according to various examples. The patterned transparent conductive layer CL1/CL2 may include plural the electrodes E1-E4, which may be striped as shown in FIG. 9A. The striped electrodes E1-E4 may be configured to control a phase retardation and realize a prism or a lenticular lens. As shown in FIG. 9A, the striped electrodes E1-E4 may be disconnected from each other, such that the controller 170 provides suitable voltages to the electrodes E1-E4 respectively. In some other embodiments, as shown in FIG. 9B, at least two of the striped electrodes E1-E4 are connected to the controller 170 by a trunk electrode E5, such that the controller 170 provide the same voltage to the electrodes E1-E4.

In some examples, as shown in FIG. 9C, the patterned transparent conductive layer CL1/CL2 may include plural the electrodes E6 and E7, which are circular, so as to provide a lens effect and realize a liquid crystal lens. The electrodes E6 and E7 may be connected to the controller 170 through wires 172. In some examples, the electrode E6 is provided with a first voltage, the electrode E7 is provided with a second voltage greater than the first voltage, such that a non-uniform electrical field is created, and a phase difference distribution of the liquid crystal material 140 can imitate that of a lens.

It is noted that the pattern of the patterned transparent conductive layer CL1/CL2 or the arrangement of the electrodes shown in the figures should not limit the scope of the present disclosure; the patterned transparent conductive layer CL1/CL2 may be designed according to actual requirements.

In some embodiments, the controller 170 may be suitable software or hardware. For example, the controller 170 may be application-specific integrated circuit (ASIC), advanced (reduced instruction set computing (RISC) machine (ARM), central processing unit (CPU), single integrated circuit device, or other devices suitable for performing calculation or executing commands. The exemplary devices should not limit the scope of the present disclosure.

Figure 10:
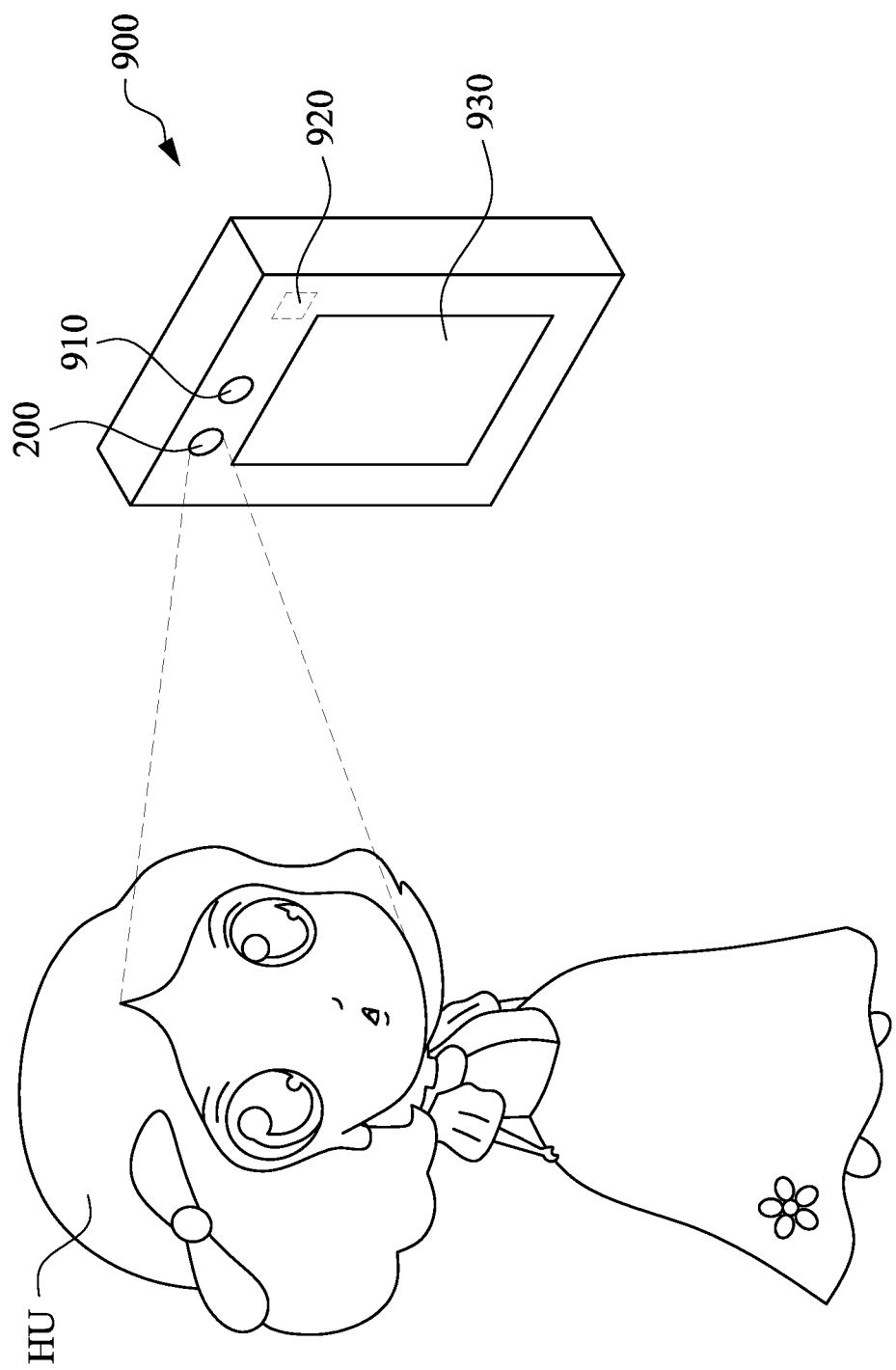
FIG. 10 is a schematic, pictorial illustration of a system for optical three-dimensional mapping in accordance with an embodiment of the present invention.

FIG. 10 is a schematic, pictorial illustration of a system 900 for optical 3D mapping in accordance with some embodiments of the present invention. System 900 includes the aforementioned projection device 200, an image capture component 910, an image processor 920. The aforementioned projection device 200 generates and projects a pattern onto a region. In the pictured example, this region contains a human user HU. Details of the design and operation of projection device 200 are shown in the previous figures and thereto not repeated herein.

The image capture component 910 captures an image of the pattern appearing on user HU. The image processor 920 processes image data generated by image capture component 910 in order to reconstruct a 3D map of user HU. The image processor 920 computes the 3D coordinates of points on the surface of the user's body, for example, by triangulation, based on the transverse shifts of the spots in an image of the pattern that is projected onto the object relative to a reference pattern at a known distance from the system 900.

Image processor 920 may comprise a general-purpose computer processor, which is programmed in software to carry out the functions described hereinbelow. The software may be downloaded to processor 920 in electronic form, over a network, for example, or it may alternatively be provided on tangible storage media, such as optical, magnetic, or electronic memory media. Alternatively or additionally, some or all of the functions of the image processor may be implemented in dedicated hardware, such as a custom or semi-custom integrated circuit or a programmable digital signal processor (DSP). The image processor 920 may be electrically connected to the controller 170 (referring to FIGS. 1A and 1B) that controlling the operation of the projection device 200.

The 3D map that is generated by processor 920 may be used for a wide range of different purposes. In some embodiments, the map may be used in face recognition. In some other embodiments, the map may be used to provide a gesture-based user interface, in which user movements detected by means of the image capture component 910 control an interactive computer application, such as a game, and interact with objects shown on a display 930. Alternatively, the system 900 may be used to create 3D maps of objects of other types, for substantially any application in which 3D coordinate profiles are needed.

Based on the above discussions, it can be seen that the present disclosure offers advantages. It is understood, however, that other embodiments may offer additional advantages, and not all advantages are necessarily disclosed herein, and that no particular advantage is required for all embodiments. One advantage is that at least two different diffraction patterns can be provided by one projection device, for example along the same axis, thereby improving 3D mapping application. Another advantage is that a projection device may be switched between transmissive and diffracting operating states or between diffusing and diffracting operating states, which may provide suitable light distribution to user.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical surface mapping system, comprising:
   a light source providing a light to a target region;
   a first liquid crystal element comprising a first diffractive optical element layer and a first liquid crystal material, wherein the first diffractive optical element layer comprises a plurality of repeating first units, each of the first units has a first protruding portion, and the first protruding portion comprises a first sidewall, a second sidewall substantially parallel with the first sidewall, and a first flat surface connecting the first sidewall to the second sidewall, each of the first and second sidewalls comprises a first segment adjoining a first part of the first protruding portion and a second segment adjoining a second part of the first protruding portion, a first distance between the first segment of the first sidewall and the first segment of the second sidewall is greater than a second distance between the second segment of the first sidewall and the second segment of the second sidewall from a top view, and the first liquid crystal material is disposed contiguously with the first sidewall, the second sidewall, and the first flat surface of the first protruding portion of the first diffractive optical element layer;

a second liquid crystal element comprising a second diffractive optical element layer and a second liquid crystal material, wherein the second diffractive optical element layer comprises a plurality of repeating second units, each of the second units has a second protruding portion, and the second protruding portion comprises a third sidewall, a fourth sidewall substantially parallel with the third sidewall, and a second flat surface connecting the third sidewall to the fourth sidewall, each of the third and fourth sidewalls comprises a first segment adjoining a first part of the second protruding portion and a second segment adjoining a second part of the second protruding portion, a third distance between the first segment of the third sidewall and the first segment of the fourth sidewall is greater than a fourth distance between the second segment of the third sidewall and the second segment of the fourth sidewall from a top view, and the second liquid crystal material is disposed contiguously with the third sidewall, the fourth sidewall, and the second flat surface of the second protruding portion of the second diffractive optical element layer, wherein the first liquid crystal element is configured to receive the light from the light source and send the light to the second liquid crystal element, and the second liquid crystal element is configured to receive the light from the first liquid crystal element and send the light to the target region, wherein the first and second liquid crystal elements are configured to apply a pattern to the light;

an image capture component configured to capture an image of the pattern reflected by the target region and generate image data; and a processor configured to generate a three-dimensional map according to the image data.

2. The optical surface mapping system of claim 1, wherein the first liquid crystal element does not comprise a polymer in the first liquid crystal material, and the second liquid crystal element does not comprise a polymer in the second liquid crystal material.

3. The optical surface mapping system of claim 1, wherein at least one of the first and second liquid crystal elements further comprises a polymer in one of the first and second liquid crystal materials of said one of the first and second liquid crystal elements.

4. The optical surface mapping system of claim 3, wherein another one of the first and second liquid crystal elements does not comprise the polymer.

5. The optical surface mapping system of claim 3, wherein said one of the first and second liquid crystal materials is doped with a chiral dopant.

6. The optical surface mapping system of claim 3, wherein the first protruding portion of the first diffractive optical element layer is opposite to the light source.

7. The optical surface mapping system of claim 3, the second protruding portion of the second diffractive optical element layer is opposite to the light source.

8. The optical surface mapping system of claim 1, wherein the light source comprises an emitter array providing a plurality of beams of the light.

* * * * *